A. C. COOKE.
CUTTER.
APPLICATION FILED APR. 3, 1913.
1,196,337.
Patented Aug. 29, 1916.
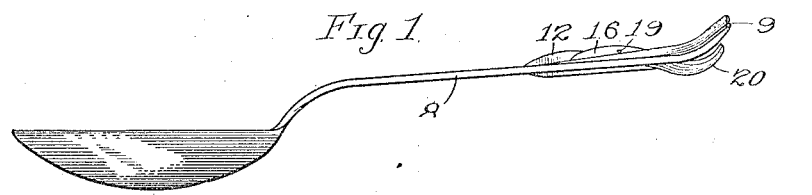
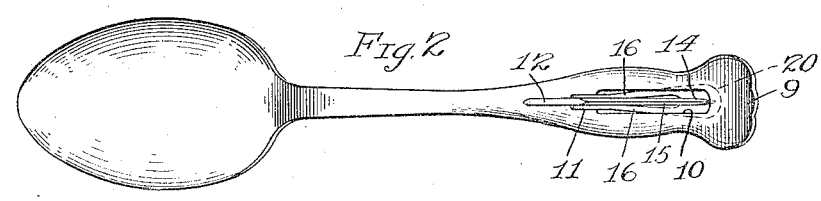
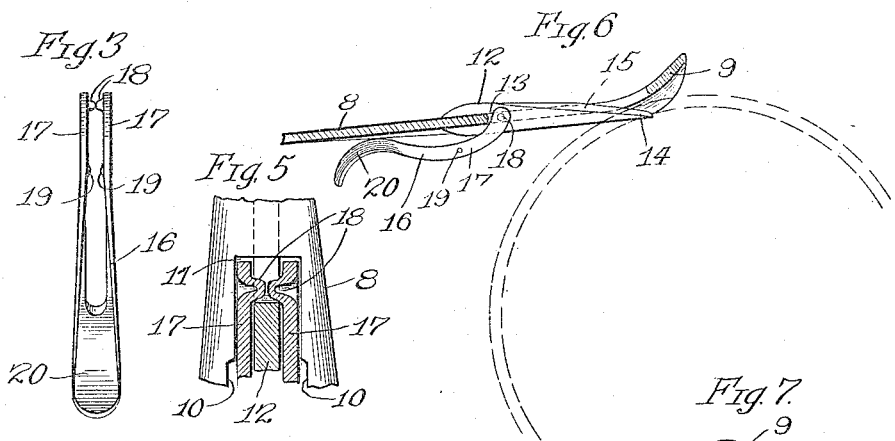
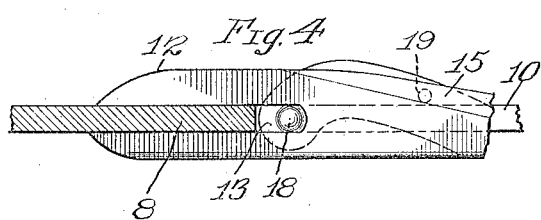
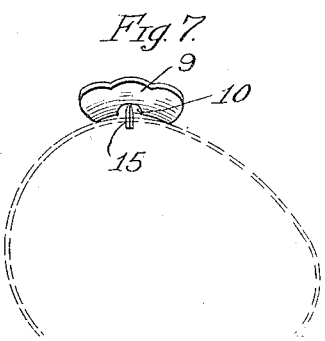
Witnesses:
L. B. Graham
K. W. Wonnell
Inventor:
Adrian C. Cooke
By Brown, Hopkins, Nissen & Sprinkle
Atty's.

UNITED STATES PATENT OFFICE.

ADRIAN C. COOKE, OF CHICAGO, ILLINOIS, ASSIGNOR TO JOHN W. PITCHER, OF CHICAGO, ILLINOIS.

CUTTER.

1,196,337.  Specification of Letters Patent.  Patented Aug. 29, 1916.

Application filed April 3, 1913. Serial No. 758,538.

*To all whom it may concern:*

Be it known that I, ADRIAN C. COOKE, a citizen of the United States, residing in Chicago, in the county of Cook and State of Illinois, have invented certain new and useful Improvements in Cutters, of which the following is a specification.

This invention relates to cutters and more particularly to a device of this class for removing the rind or the shell from oranges, eggs and the like, and the principal object of the invention is to provide a new and improved device of this class which is simple, durable and inexpensive in construction and effective and efficient in operation.

A further object of the invention is to provide a guard for the blade of the device whereby it may be readily covered when not in use.

For the attainment of these ends and the accomplishment of other new and useful objects, as will appear, the invention consists in the features of novelty in the construction, combination and arrangement of the several parts generally shown in the drawings and described in the specification, but more particularly pointed out in the appended claims.

In the drawings: Figure 1 is a side elevation of a spoon provided with a paring attachment constructed in accordance with the principles of my invention; Fig. 2 is a plan view of the same; Fig. 3 is a detail view of the guard; Fig. 4 is a detail view showing a portion of the blade and the pivotal mounting of the guard; Fig. 5 is a detail plan view of the pivotal mounting of the guard; Fig. 6 illustrates the application of the device in removing the rind of an orange, and Fig. 7 is a view showing the application of the device in removing the shell of an egg.

In preparing certain articles for eating it is sometimes inconvenient to remove the rind or shell; for example, in eating an orange it is customary to pare the rind with a knife. Also in breaking an egg extreme care must be taken or the contents will be spilled from the shell.

The present invention relates to a device preferably incorporated in the handle of a spoon by means of which the shell or rind of an article may be quickly and easily removed from the article or separated in such a manner that the edible contents may be easily obtained and eaten.

In the drawings this device is shown as incorporated in the handle 8 of a spoon. The spoon handle may be of any well-known form designed or constructed and it is commonly formed at the extremity with a transversely rounded and up-turned tip 9, the rounded portion being concave from the under side thereof. Adjacent the extremity of the spoon it is provided with an aperture 10 with a portion 11 reduced in width. A blade 12, slightly greater in length than the aperture 10, is formed at one end with a slit 13 and with a pointed extremity 14 at the other end. One side of the blade is formed with a cutting edge 15 which extends from intermediate the ends to the sharpened extremity 14. A guard 16, preferably constructed of some resilient or spring metal, is provided with a bifurcated extremity having sides 17 parallel to each other which are adapted to be placed on both sides of the blade 12 and are formed at their extremities with inwardly extending projections 18 which constitute a pivot for the guard which is adapted to be engaged in the slot 13 of the blade. These projections are preferably formed by pressing the metal inwardly a slight distance but not breaking it through. The recess which forms the bifurcations extends intermediate of the ends of the guard so that the sides 17 thereof are of sufficient resilience to frictionally engage the blade or move in contact therewith and to hold the guard in position with respect to the blade. If desired, the sides 17 may also be provided with projections 19 which will frictionally engage the sides of the blade, but they are not absolutely necessary. The other end of the guard is curved longitudinally as at 20 so that the extremity of the guard will extend over the pointed end of the blade.

In assembling this device the guard is placed in position over the blade with the projections 18 in the bottom of the slit 13; the slit of the blade is then pressed over the handle member 8 at the end of the reduced portion 11 of the aperture in the handle member until the guard is substantially in contact with the handle member 8, as shown more clearly in Fig. 4, whereupon the sides 17 of the guard will be held firmly in position by the engagement of the sides of the reduced portion 11 of the aperture which is of the correct width to receive the guard.

The slotted extremity of the blade is then secured to the handle member 8 by soldering or in any other suitable manner, and the pointed extremity of the blade is disposed adjacent the up-turned end 9 of the handle member with the cutting edge of the blade disposed toward the under face of the handle member. When the guard is in position over the end of the blade the curved end 20 is substantially in contact with the extremity of the handle member and there is no danger of contact with the pointed or sharpened edge of the blade. The guard is retained in this position by the frictional engagement of its sides with the sides of the blade, as previously explained. To remove or slit the shell or rind of an article it is necessary only to remove the guard by turning it backwardly, as shown in Fig. 6, upon its pivotal mounting and to apply the concave end of the handle member to the article to be treated. By varying the inclination of the handle member with respect to the surface of the article any desired depth of cut may be made by simply sliding the handle member relatively with respect to the article, the point of the blade being inserted to the proper depth.

This device is particularly adapted to be incorporated in the handle of a spoon for the reason that when the rind of an orange, for example, is to be removed the spoon may be used after the rind is slit to assist in removing the rind and in eating the orange; in opening an egg a portion of the shell may be removed and the spoon may then be used to eat the egg directly from the shell. Furthermore, the extremities of spoon handles are generally curved slightly at the ends and formed with a widened portion adjacent the extremity which constitutes a particularly well adapted place to insert this device where it will be convenient when desired, and entirely out of the way when not desired. It is obvious, however, that such a device could be entirely separate and distinct or incorporated with other utensils.

What I claim is:

1. In a device of the class described, the combination with a substantially flat handle member formed with an aperture intermediate the ends, of a blade having a slit at one end adapting it to be secured to the aperture of the handle member and at right angles to the plane of the handle member, the other end of the blade being pointed and extending a slight distance from the handle member with the cutting edge on the inside of the blade and the handle member extending beyond the ends of the blade in both directions.

2. In a cutter of the class described, the combination with a substantially flat member having a concavely arched portion adjacent one end and with the aperture intermediate the ends, of a blade having a slot at one end adapting it to be connected in the aperture of the member and secured to the member thereby at right angles to the said member with the other end of the blade pointed and projecting from one side of the member adjacent the concavely arched portion but having the end of the handle extending beyond the pointed tip of the blade, the cutting edge of the blade being disposed on that side adjacent the handle member where it is protected, the depth of cut being limited by the distance of the tip of the blade from the handle member.

3. The combination with a handle member, of a blade fixed at one end intermediate the ends of the member and extending at right angles therefrom on one side of the member, a blade having a free pointed extremity spaced from the member with the cutting edge on the inside of the blade adjacent the member, and a guard pivotally mounted at the fixed end of the blade and movable over the blade against the handle member to cover the free extremity of the blade.

4. In a device of the class described, the combination with a handle member, of a separate cutting blade projecting and offset from one side thereof, and a guard therefor pivotally connected thereto and adapted to frictionally engage the blade to hold the guard yieldingly in position against the handle member and over the projecting blade.

5. In a device of the class described, the combination with a handle member, of a separate blade having one end secured to the handle member intermediate the ends thereof and the other end projecting at one side of the member, and a guard pivotally mounted between the connected end of the blade and the member having a seating groove for the blade and adapted to be moved over the projecting end of the blade against the handle member.

6. In a device of the class described, the combination with a handle member, of a blade formed with a slit and adapted to be secured to the member on both sides of the slit with the end of the slit spaced from the member to form an opening, and a guard with projections disposed in the said opening and having a free end adapted to be pivotally moved with respect to the blade and to cover the other extremity thereof.

7. In a device of the class described, the combination with an apertured handle member, of a blade secured at one end to the handle member in the aperture, the other end of the blade projecting from the face of the handle member and formed with a cutting edge, and a guard pivotally mounted to the blade adjacent the slit portion thereof and movable over the projecting end of the blade in contact with the end of the member.

8. In a device of the class described, the combination with a slit handle member formed with a portion of the slit of reduced width, of a blade having a slit at one end adapted to be inserted in the slit in the handle member at the end of reduced width, the portions of the blade on both sides of the slits being disposed on both sides of the member and the end of the slit in the blade being spaced from the end of the slit in the member, and a guard formed with a bifurcated extremity embracing the blade and with pivotal projections disposed in the slit and movable over the other end of the blade.

9. In a device of the class described, the combination with a utensil having a substantially flat handle member with an aperture therein, one end of the aperture being reduced in width, of a blade member slit at one end and pointed at the other with a cutting edge extending to the point, and a guard for the blade comprising a bifurcated extremity embracing the blade with projections in the bifurcations extending inwardly into the slit of the blade and forming a pivot to permit the guard to be rotated with respect thereto, the blade with the guard thereon being positioned in the slit of the handle member and secured thereto, the reduced portion of the aperture in the handle member engaging the bifurcated extremity of the guard to hold it securely in position and the pointed end of the blade projecting from the member with the cutting edge thereof disposed inwardly and the guard being foldable over the pointed end of the blade.

10. In a paring device of the class described, the combination of a blade pointed at one end and having a slit at the other end, and a guard therefor constructed of spring material bifurcated at one end with the bifurcations folded over the sides of the blade and provided with raised portions in the bifurcated extremity which are adapted to enter the slit of the blade member to form a pivot for the guard, the other end of the guard being rounded longitudinally to cover the pointed extremity of the blade and the sides of the guard being adapted to resiliently engage the blade to hold the guard in position when it is folded over the blade.

In testimony whereof I have signed my name to this specification, in the presence of two subscribing witnesses, on this 25th day of March, A. D. 1913.

ADRIAN C. COOKE.

Witnesses:
CHAS. H. SEEM,
K. W. WONNELL.

Copies of this patent may be obtained for five cents each, by addressing the "Commissioner of Patents, Washington, D. C."